United States Patent
Spesser

(10) Patent No.: US 11,670,948 B2
(45) Date of Patent: Jun. 6, 2023

(54) METHOD AND SYSTEM FOR INTEGRATING A PERIPHERAL CHARGE CONTROLLER INTO A NON-DC-ISOLATED CHARGING DEVICE

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 16/692,207

(22) Filed: Nov. 22, 2019

(65) Prior Publication Data
US 2020/0169098 A1  May 28, 2020

(30) Foreign Application Priority Data
Nov. 22, 2018  (DE) .................... 10 2018 129 413.1

(51) Int. Cl.
| | | |
|---|---|---|
| H02J 7/00 | (2006.01) |
| B60L 53/16 | (2019.01) |
| B60L 53/60 | (2019.01) |
| H02J 7/02 | (2016.01) |

(52) U.S. Cl.
CPC ............ *H02J 7/0029* (2013.01); *B60L 53/16* (2019.02); *B60L 53/60* (2019.02); *H02J 7/0045* (2013.01); *H02J 7/02* (2013.01)

(58) Field of Classification Search
CPC .................................................... H02J 7/0029
See application file for complete search history.

(56) References Cited

U.S. PATENT DOCUMENTS

| | | | |
|---|---|---|---|
| 2012/0299531 A1 | 11/2012 | Prosser et al. | |
| 2014/0035527 A1* | 2/2014 | Hayashigawa | B60L 3/0023 320/109 |
| 2014/0266470 A1* | 9/2014 | Maxim | H03F 3/195 330/307 |
| 2015/0042159 A1 | 2/2015 | Kim et al. | |
| 2016/0204624 A1* | 7/2016 | Small, Jr. | H02J 7/00711 320/139 |
| 2017/0349054 A1 | 12/2017 | Yang et al. | |
| 2018/0162229 A1* | 6/2018 | Gotz | B60L 58/21 |

FOREIGN PATENT DOCUMENTS

| | | |
|---|---|---|
| CN | 104638740 | 5/2015 |
| CN | 204376509 | 6/2015 |
| CN | 206217667 | 6/2017 |
| CN | 108407625 | 8/2018 |

OTHER PUBLICATIONS

Search Report dated Dec. 2, 2022.

* cited by examiner

*Primary Examiner* — Robert Grant
(74) *Attorney, Agent, or Firm* — Gerald E. Hespos; Michael J. Porco

(57) ABSTRACT

A method is provided for implementing electric-shock protection in a transformer-free AC charging device (202). The method includes supplying an input end of the AC charging device (202) with alternating current from a charging socket (122), providing the output end of the AC charging device (202) with direct current (106) for charging a high-voltage battery, and using the peripheral charge controller (220) for controlling the charging socket (122). The peripheral charge controller (220) is arranged within a housing of the AC charging device (202).

16 Claims, 2 Drawing Sheets

METHOD AND SYSTEM FOR INTEGRATING A PERIPHERAL CHARGE CONTROLLER INTO A NON-DC-ISOLATED CHARGING DEVICE

CROSS REFERENCE TO RELATED APPLICATION

This application claims priority under 35 USC 119 to German Patent Appl. No. 10 2018 129 413.1 filed on Nov. 22, 2018, the entire disclosure of which is incorporated herein by reference.

BACKGROUND

Field of the Invention

The invention relates to a method and a system for integrating a peripheral charge controller into a non-DC-isolated charging device.

Related Art

A modern-day AC charging device in an electric vehicle is called an on-board charging device and converts a 110 V or 240 V 50/60 Hz grid voltage of a supply grid to a high DC voltage at an output end for charging a high-voltage battery. The grid voltage is provided at an input end by a charging cable that is connected to a charging socket. The input and the output part are isolated by at least one DC-decoupled transformer to establish electric-shock protection for safety reasons and to avoid DC voltage feedback from the high-voltage battery.

For example, US 2017/0349054 A1 describes an on-board charging device that has been integrated with an inverter and has DC-isolating transformers that transmit an input-end AC voltage to a secondary side that is connected to the inverter. The high-voltage battery is charged with a DC voltage provided by the inverter.

Non-DC-isolated charging devices can be used to avoid disadvantages of isolating transformers, such as weight and costs, but the electrical components of non-DC-isolated charging devices have to ensure the safety conditions. The incipient series production of electric vehicles will lead to an increase in the use of these electronic components, the quantities of which will increase immensely and the individual prices of which are expected to fall. At the same time, new requirements, such as Big Data, Collect or Emobility come into play. Reorientation of the installed electronic components in this respect therefore requires a change in distribution and integration into other assemblies in the electric vehicle. US 2015/0042159 A1 discloses an integrated on-board charging device that has been combined with a low voltage converter.

One task of the charging peripheral is to meet different charging standards. For example, document US 2012/0299531 A1 discloses a service vehicle that has been designed to charge batteries of electric vehicles. A large number of battery connections, control and operating units are distributed in the service vehicle to execute a charging process. Conversely, a peripheral charge controller is arranged in an electric vehicle between the charging socket and the on-board charging device. The peripheral charge controller controls the charging process at the charging socket in respect of plug identification, position of a charging socket cover or worldwide charging standards. To date, this peripheral charge controller has been arranged in a distributed manner in the electric vehicle according to the prior art.

Against this background, one object of the invention is to provide an AC charging device that is optimized in respect of efficiency, weight, costs and effectiveness and into which the peripheral charge controller has been integrated for improving the packaging. The worldwide charging standards likewise should be fulfilled along with identification of the plugs that are connected to the charging socket.

SUMMARY

The invention relates a method for integrating a peripheral charge controller into a non-DC-isolated AC charging device so that electric-shock protection is implemented by a safety circuit in the non-DC-isolated, i.e. generally transformer-free, AC charging device. The method supplies the input end of the AC charging device with alternating current from a charging socket. Direct current for charging a high-voltage battery is provided by the AC charging device at its output end. The charging socket is controlled by the peripheral charge controller that is arranged within a housing of the AC charging device.

The non-DC-isolated charging device is DC-coupled. In accordance with standard ISO 6469, electric-shock protection has to be ensured, and thus a safety circuit is arranged in the non-DC-isolated charging device. The safety circuit may be implemented with space-saving and cost-saving power semiconductor electronics. Furthermore, a control unit is arranged in the non-DC-isolated charging device to control the power semiconductor electronics. The AC voltage that is applied at the input end is converted into the output-end DC voltage by the power semiconductor electronics together with the control unit.

A charging process is controlled by the peripheral charge controller that is integrated into the non-DC-isolated charging device. The peripheral charge controller may control a visual display for a driver of the electric vehicle or other person initiating the charging process. Multiple use of integrated circuits of the non-DC-isolated charging device, such as a controller, is made possible by the integration of the peripheral charge controller.

The peripheral charge controller executes a series of functions that relate to the charging process. All of these functions are integrated into the non-DC-isolated charging device by the method of the invention.

In one embodiment, the peripheral charge controller monitors opening or closing of a charging socket flap of the charging socket, into which a charging plug can be inserted or plugged.

In a further embodiment the peripheral charge controller executes a charging plug identification. In particular, a voltage type, for example DC voltage, single-phase, three-phase or polyphase AC voltage, is carried by a charging plug or a voltage level is identified.

In a further embodiment of the method the peripheral charge controller controls the charging plug. In particular, locking of the charging plug in the charging socket is monitored during the charging process.

The peripheral charge controller may further execute diagnoses relating to a charging process, such as temperature monitoring.

The method may further include using the peripheral charge controller to provide charging standards. These charging standards may be selected in accordance with a country name, such as USA, or a name of a region, such as Europe, or a country charging standard, such as CHAdeMO in Japan or GBT in China for example.

In one embodiment, the peripheral charge controller may comprise a software module of the method according to the invention, the AC charging device is acted on by a software module that holds algorithms for executing the charging process. A respective algorithm may be executed on a computer unit that is integrated into the non-DC-isolated charging device or integrated circuit.

Functions for the charging process that go beyond the abovementioned embodiments can be implemented in further modules of the peripheral charge controller and can be integrated into the non-DC-isolated charging device.

The invention further relates to a system for integrating a peripheral charge controller into a non-DC-isolated AC charging device. The system comprises a non-DC-isolated AC charging device and a peripheral charge controller module that is arranged within a housing of the AC charging device. The system may be configured to execute at least one aspect of the method described above.

The system further may comprise a 12 V interface to an actuating system of a charging peripheral.

Further advantages and refinements of the invention can be found in the description and the accompanying drawings. The features mentioned above and those explained below can be used in the respectively indicated combination and also in other combinations or on their own, without departing from the scope of the invention. The figures are described coherently and comprehensively; identical components are assigned the same reference signs.

DETAILED DESCRIPTION

Figure 1:
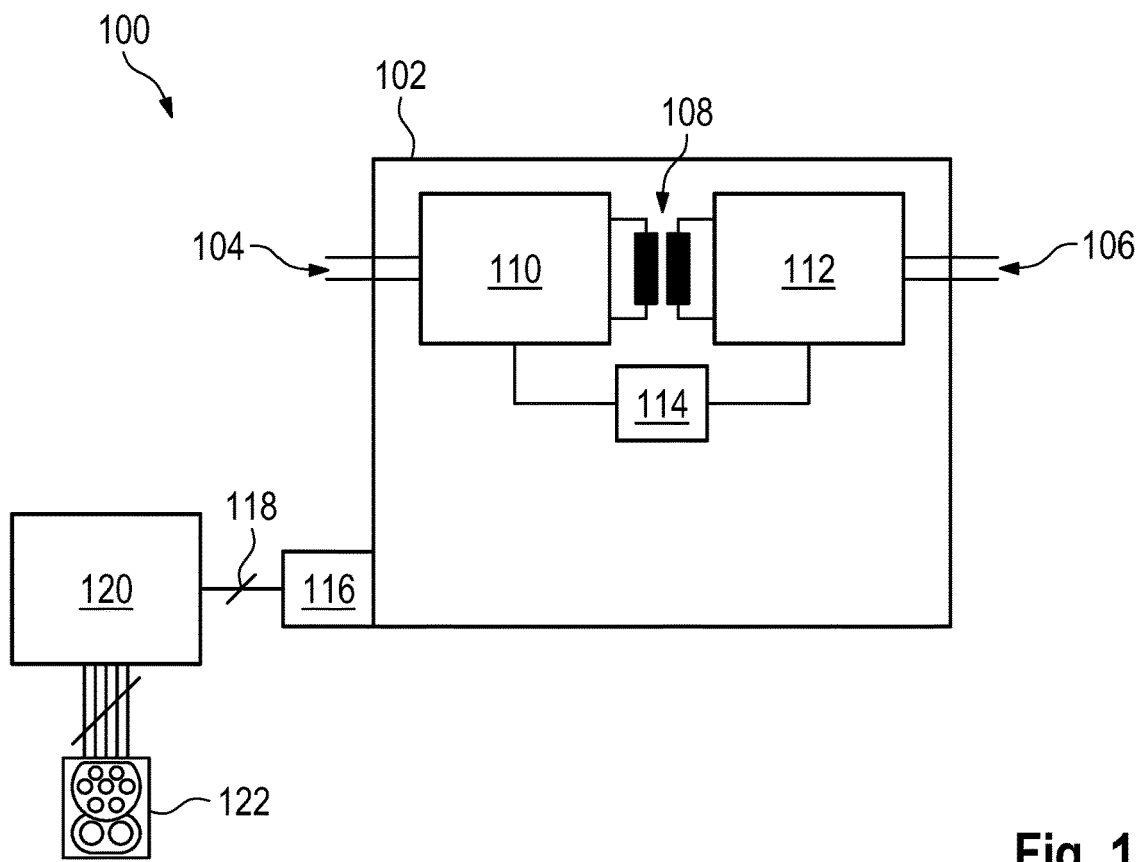
FIG. 1 schematically shows a circuit diagram of a DC-isolated charging device and a peripheral charge control device according to the prior art.
Figure 2:
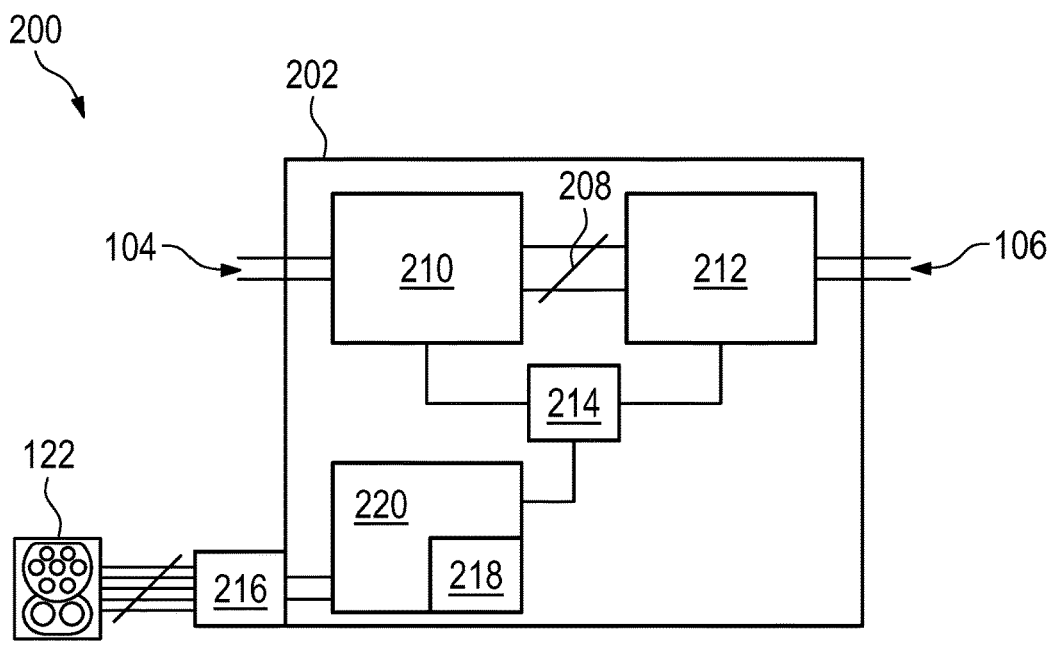
FIG. 2 schematically shows a circuit diagram of a non-DC-isolated charging device with an integrated peripheral charge controller according to one embodiment of the method according to the invention.
Figure 3:
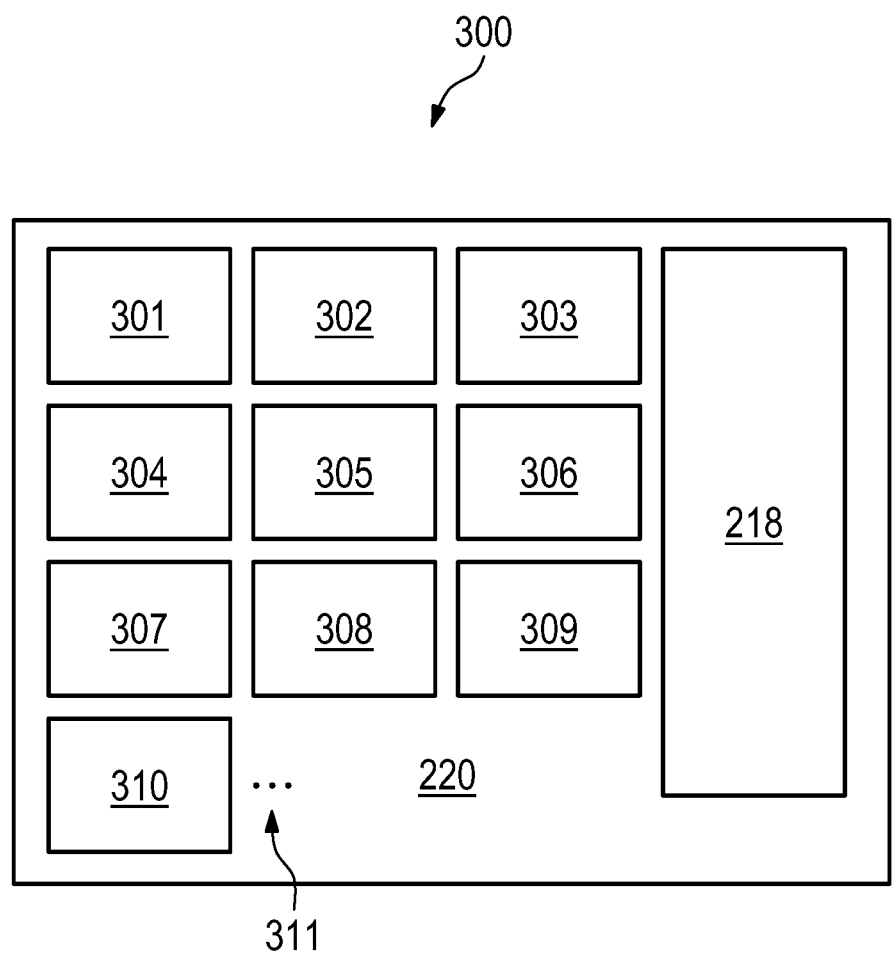
FIG. 3 schematically shows a circuit diagram of a peripheral charge controller that is integrated into the non-DC-isolated charging device, according to one embodiment of the method according to the invention.

FIGS. 1-3 schematically illustrate an embodiment of the invention. The elements shown in the figures may be implemented in various forms of hardware, software or combinations thereof. Preferably, these elements are implemented in a combination of hardware and software on one or more appropriately programmed general-purpose devices that may include a processor, memory and input/output interfaces. The term "connected" as used herein is defined to mean directly connected to or indirectly connected with through one or more intermediate components. Such intermediate components may include both hardware and software-based components.

It will be appreciated by those skilled in the art that the block diagrams presented herein represent conceptual views of illustrative circuitry embodying the principles of the disclosure. Similarly, any functions or methods implied by these block diagrams may be represented in computer readable media and so executed by a computer or processor, whether or not such computer or processor is explicitly shown.

FIG. 1 schematically shows a circuit diagram 100 of a DC-isolated charging device 102 and a peripheral charge control device 120 according to the prior art. The charging device 102 comprises an input stage 110 and an output stage 112. An alternating current 104, which is provided by a charging plug which is located in a charging socket 122, is applied to the input stage 110. The output stage 112 is DC-isolated from the input stage 110 by an isolating transformer 108 and provides a DC voltage 106 at the output end of the charging device 102 for the purpose of charging a high-voltage battery. The input stage 110 and the output stage 112 are controlled by a control unit 114. The charging device 102 is connected, at its interface 116 which can be a 12 V interface with 6 pins for example, to the peripheral charge control device 120 via a CAN bus 118. The peripheral charge control device 120 controls a charging process at the charging socket 122.

FIG. 2 schematically shows a circuit diagram 200 of a non-DC-isolated charging device 202 with an integrated peripheral charge controller 220 as a result of an embodiment of the method according to the invention. The non-DC-isolated charging device 202 comprises an input stage 210 and an output stage 212. An alternating current 104, which is provided by a charging plug which is located in a charging socket 122, is applied to the input stage 210. In contrast to existing charging devices which are used in electric vehicles, there is a DC coupling 208 between the input stage 210 and the output stage 212. The non-DC-isolated charging device 202 provides a DC voltage 106 at the output end for the purpose of charging a high-voltage battery. According to the invention, the peripheral charge controller 220 together with the software module 218 is integrated into the non-DC-isolated charging device 202. It is to be appreciated that software module 218 may be stored in a memory of device 202 and executed by controller 220. In one embodiment, some or all of the functions of controller 220 may be performed by at least one processor, such as a computer or an electronic data processor, digital signal processor or embedded micro-controller, in accordance with code, such as computer program code, software, and/or integrated circuits that are coded to perform such functions, unless indicated otherwise. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. The peripheral charge controller 220 controls the charging process at the charging socket 122 via the interface 216 of the non-DC-isolated charging device. The interface 216 may be, for example, a 12 V interface with 60 pins. The input stage 210, the output stage 212 and the peripheral charge controller 220 are connected to one another by means of a control module 214 in the non-DC-isolated charging device 202.

FIG. 3 schematically shows a circuit diagram 300 of a peripheral charge controller 220 which is integrated into the non-DC-isolated charging device as a result of a further embodiment of the method according to the invention. The peripheral charge controller 220 controls the charging process being performed at the charging socket. To this end, the peripheral charge controller 220 includes one or more modules which may comprise dedicated controller or processing devices and/or software stored in one or more memories of controller 220 or device 202. Controller 220 includes at least a module for monitoring a charging socket flap lock 301, a module for identifying a charging plug 302, a module for monitoring a charging plug lock 303, a control pilot module 304, a module for a Japanese charging standard CHAdeMO 305, a module 306 for charging according to the Chinese DC standard GBT, a module 307 for the charging process in the USA, a module 308 for charging processes in other countries (besides China, Japan and the USA), a diagnosis module 309, a temperature monitoring module 310. Further modules 311 can be arranged within the peripheral charge controller 220. One or more of modules 301-310 may be implemented as software that is stored in memory and executed by processing device and/or controller 220. Furthermore, one or more of modules 301-310 may be implemented as hardware that is in communication with and/or controlled by the controller 220. Finally, the software module 218 (e.g., software stored on a memory of device 220 or device 202) holds algorithms for executing (e.g., by controller 220) the charging process.

One or more of modules 301-310 may be implemented as software that is stored in memory (not shown) and executed by processing device and/or controller 220. Furthermore, one or more of modules 301-310 may be implemented as hardware that is in communication with and/or controlled by controller 220. Finally, the software module 218 may be software stored on a memory of device 220 or device 202.

Finally, the software module 218 holds algorithms for executing the charging process.

What is claimed is:

1. A method for integrating a peripheral charge controller into a non-DC-isolated AC charging device of an electric vehicle, the method comprising using a safety circuit to implement electric-shock protection in the non-DC-isolated AC charging device, arranging the peripheral charge controller within a housing of the AC charging device of the electric vehicle and coupling the peripheral charge controller to a charging socket, supplying an input end of the AC charging device with alternating current from the charging socket, using an output end of the AC charging device for providing direct current for charging a high-voltage battery of the electric vehicle, the peripheral charge controller coupled to the input end and output end of the AC charging device within the housing via a control unit, and using the peripheral charge controller for executing identification of a charging plug disposed in the charging socket and controlling the charging socket based on the identification of the charging plug.

2. The method of claim 1, further comprising using the peripheral charge controller to monitor a charging socket flap.

3. The method of claim 1, further comprising using peripheral charge controller for executing charging plug control.

4. The method of claim 1, further comprising using the peripheral charge controller to execute temperature monitoring.

5. The method of claim 1, further comprising using the peripheral charge controller for providing different charging standards based on the identification of the charging plug.

6. The method of claim 5, wherein the charging standards are selected in accordance with a country name or a country charging standard.

7. The method of claim 1, further comprising using a software module of the peripheral charge controller to act on the AC charging device.

8. A charging system of an electric vehicle, comprising: a non-DC-isolated AC charging device and a peripheral charge controller module arranged within a housing of the AC charging device, wherein the system is configured to execute the method of claim 1.

9. The system of claim 8, further comprising a 12 V interface to an actuating system of a charging peripheral.

10. A method for integrating a peripheral charge controller into a non-DC-isolated AC charging device of an electric vehicle, the AC charging device having a housing and the peripheral charge controller being arranged in the housing of the AC charging device, the method comprising:
using a safety circuit to implement electric-shock protection in the non-DC-isolated AC charging device;
coupling the peripheral charge controller to a charging socket;
supplying an input end of the AC charging device with alternating current from the charging socket;
using an output end of the AC charging device for providing direct current for charging a high-voltage battery of the electric vehicle; and
using the peripheral charge controller to:
monitor a charging socket flap,
execute charging plug identification of a charging plug disposed in the charging socket,
control locking of the charging plug in the charging socket; and
controlling the charging socket based on the identification of the charging plug.

11. The method of claim 10, further comprising using peripheral charge controller for providing different charging standards in accordance with a country name or a region name.

12. The method of claim 1, wherein the identification of the charging plug includes identifying a voltage level of the charging plug in the charging socket.

13. The method of claim 10, wherein the charging plug identification includes identifying a voltage level of the charging plug in the charging socket.

14. The method of claim 10, further comprising using peripheral charge controller for providing different charging standards in accordance with charging plug identification.

15. The method of claim 1, wherein the identification of the charging plug includes identifying a voltage type of the charging plug in the charging socket.

16. The method of claim 10, wherein the charging plug identification includes identifying a voltage type of the charging plug in the charging socket.

\* \* \* \* \*